US007924167B2

(12) United States Patent

Hesdahl et al.

(10) Patent No.: US 7,924,167 B2

(45) Date of Patent: Apr. 12, 2011

(54) REMOTE CONTROL CODE FILTERING USED FOR RELAYING OF REMOTE CONTROL CODES

(75) Inventors: Piet Bernard Hesdahl, Blaricum (NL); Amiram Levi, Hilversum (NL)

(73) Assignee: Agere Systems Inc., Allentown, PA (US)

( * ) Notice: Subject to any disclaimer, the term of this patent is extended or adjusted under 35 U.S.C. 154(b) by 1716 days.

(21) Appl. No.: 10/874,149

(22) Filed: Jun. 22, 2004

(65) Prior Publication Data

US 2005/0280551 A1 Dec. 22, 2005

(51) Int. Cl.
*G08C 19/00* (2006.01)
*G05B 19/02* (2006.01)

(52) U.S. Cl. ......... 340/825.69; 340/825.72; 340/825.22; 370/315

(58) Field of Classification Search ............. 340/825.69, 340/825.72, 825.22, 825.49; 370/315
See application file for complete search history.

(56) References Cited

U.S. PATENT DOCUMENTS

| | | | | |
|---|---|---|---|---|
| 4,275,385 | A * | 6/1981 | White | 340/825.49 |
| 4,885,803 | A * | 12/1989 | Hermann et al. | 340/825.72 |
| 4,999,622 | A * | 3/1991 | Amano et al. | 340/825.72 |
| 5,109,222 | A * | 4/1992 | Welty | 340/825.72 |
| 5,321,542 | A * | 6/1994 | Freitas et al. | 370/315 |
| 6,424,660 | B2 * | 7/2002 | Jacobson, Jr. | 340/825.72 |
| 6,703,941 | B1 * | 3/2004 | Blaker | 340/825.69 |
| 2002/0154024 | A1 | 10/2002 | Stevenson et al. | 340/825.22 |
| 2002/0168934 | A1 | 11/2002 | Finet | 455/7 |
| 2003/0020645 | A1 | 1/2003 | Akiyama | 341/176 |
| 2004/0008798 | A1 | 1/2004 | Tsui | |

FOREIGN PATENT DOCUMENTS

| | | |
|---|---|---|
| WO | WO 89/11137 | 11/1989 |
| WO | WO 00/13344 | 3/2000 |

* cited by examiner

*Primary Examiner* — Brian A Zimmerman
*Assistant Examiner* — Nam V Nguyen
(74) *Attorney, Agent, or Firm* — Ryan, Mason & Lewis, LLP

(57) ABSTRACT

Remote control code filtering techniques are disclosed that are suitable for use in a remote control code relaying system. A portion of a received remote control code is compared with corresponding portions of stored remote control codes. The received remote control code can be filtered based on the comparison. The filtering can comprise outputting the received remote control code or a portion thereof, discarding the received remote control code, or adding a new remote control code to the stored remote control codes. The remote control code can be received from a network or from a hardware interface (e.g., which converts an electromagnetic remote control signal to the remote control code). The received remote control code can be output to a network or to a hardware interface for subsequent transmission of an electromagnetic remote control signal. Filtering can occur before or after the network.

1 Claim, 9 Drawing Sheets

REMOTE CONTROL CODE FILTERING USED FOR RELAYING OF REMOTE CONTROL CODES

FIELD OF THE INVENTION

The present invention relates generally to remote controls, and, more particularly, to relaying of remote control codes from one location to another.

BACKGROUND OF THE INVENTION

Remote controls have become invaluable tools for controlling devices. Remote controls use ElectroMagnetic (EM) signals, such as Radio Frequency (RF) or infrared (IR) signals, to represent and communicate remote control codes from the remote control to a device. In typical remote controls, buttons are assigned function codes. When a button is pressed, an infrared (IR) remote control, for example, uses the function code when determining a corresponding remote control code and creates an IR signal corresponding to the remote control code.

The IR signal is generated at a particular carrier frequency and generally comprises a header, a device code, the function code corresponding to the button, and a trailer. The header is used to alert a device that a remote control signal is being sent. The device code is used to distinguish between devices using the same carrier frequency. For example, a manufacturer might make remote controls for two devices. Each remote control for the two devices could use the same carrier frequency for IR signals, but each device will be assigned a different device code. When a device receives an IR signal, the device determines whether the device code is the device code assigned to the device. If so, the device will interpret the function code and perform the function corresponding to the function code. If not, the device will ignore the function code. The trailer is used to alert the device that the IR signal is ending.

Each manufacturer has the ability to specifically design remote control codes and their corresponding EM signals to meet its own requirements. For example, sometimes the EM signal includes a "repeat portion," which can include, for instance, the device code and the function code or simply the function code. The repeat portion is repeated for a certain number of times or while the button is pressed. The repeat portion helps to ensure that the function code is received by the device and can also be used to cause the function code to be performed multiple times.

Systems using typical IR or RF remote controls and corresponding devices tend to be very robust. Quite a bit of error, as much as ten percent or more, can occur in an IR signal, for instance, yet the correct function corresponding to the IR signal will still be performed.

Although remote controls and systems using the same are robust and beneficial, a number of significant problems remain. For instance, there can be times when signals from one remote, chosen to operate a first device, will inadvertently operate an unintended, second device. This is particularly true when the remote control and device use RF to communicate with each other, although systems using IR for communication also can be subject to such inadvertent operations. Consequently, what is needed are techniques for solving these problems.

SUMMARY OF THE INVENTION

Generally, techniques are provided for filtering remote control codes, and the techniques may be used, for example, to relay remote control codes from one location to another location while reducing or eliminating inadvertent operations caused by remote control codes.

In an exemplary aspect of the invention, in a remote control code relaying system, a remote control code is received. A portion of the received remote control code is compared with a corresponding portion of one or more stored remote control codes. The received remote control code is filtered based on the comparison. Illustratively, the filtering can comprise outputting the received remote control code (e.g., or a portion thereof) or discarding the received remote control code. Additionally, filtering can comprise adding, to the stored remote control codes, a new remote control code corresponding to the received remote control code. The addition depends on whether the remote control code is to be output or discarded.

The remote control code can be received from the network or from a hardware interface that receives the remote control code from a receiver that converts an EM remote control signal to the remote control code. The outputting of the received remote control code can be to a network, such as a wireless network, or a hardware interface for subsequent transmission of an EM remote control signal. Filtering can occur before the network or after the network. The filtering can be performed, for example, by an integrated circuit, by a computer system coupled to a network and comprising a processor coupled to a memory, or by some combination of these.

DETAILED DESCRIPTION

Figure 1:
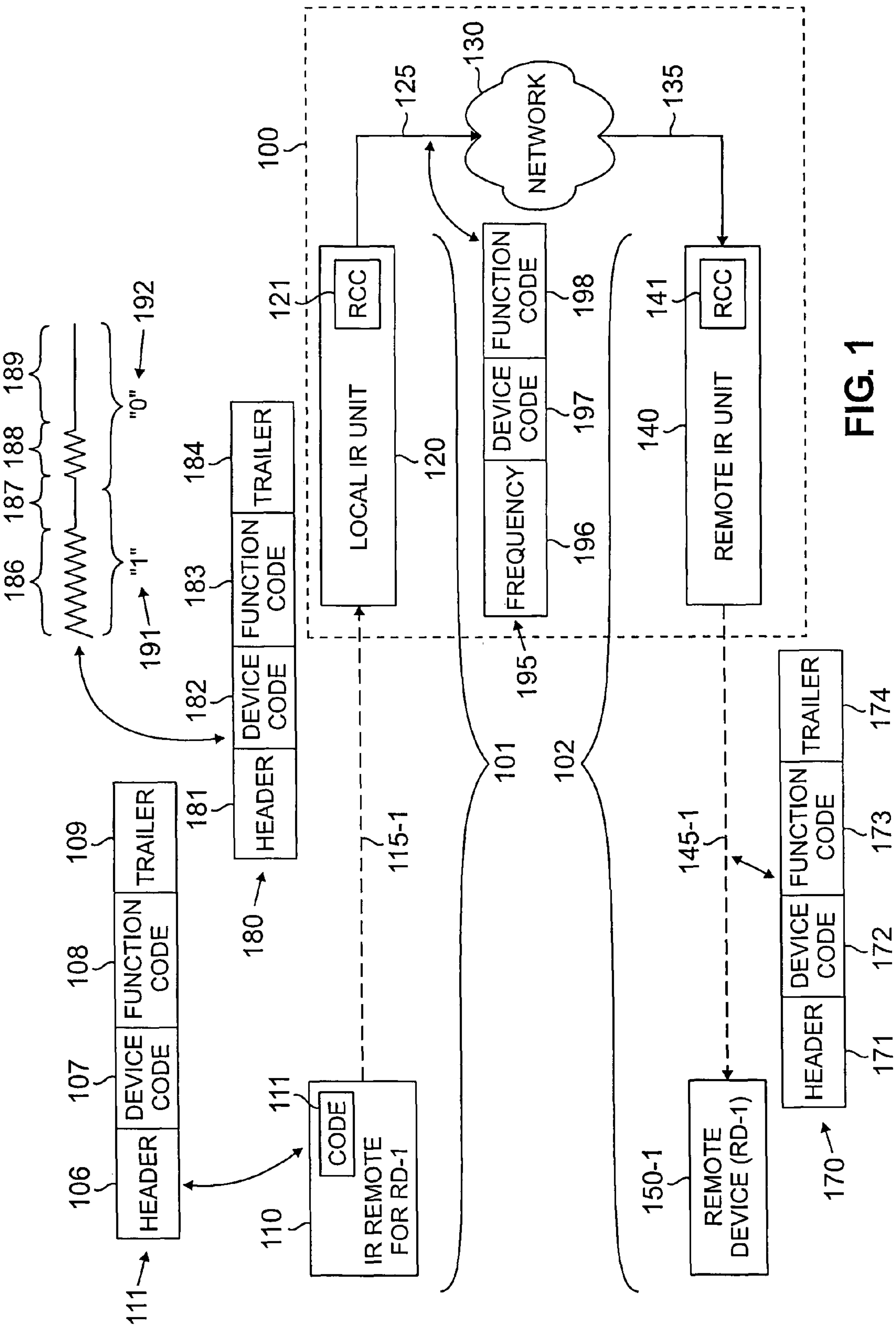
FIGS. 1 and 2 are block diagrams of an exemplary remote control code relaying system, remote controls, devices, and their interface.
Figure 2:
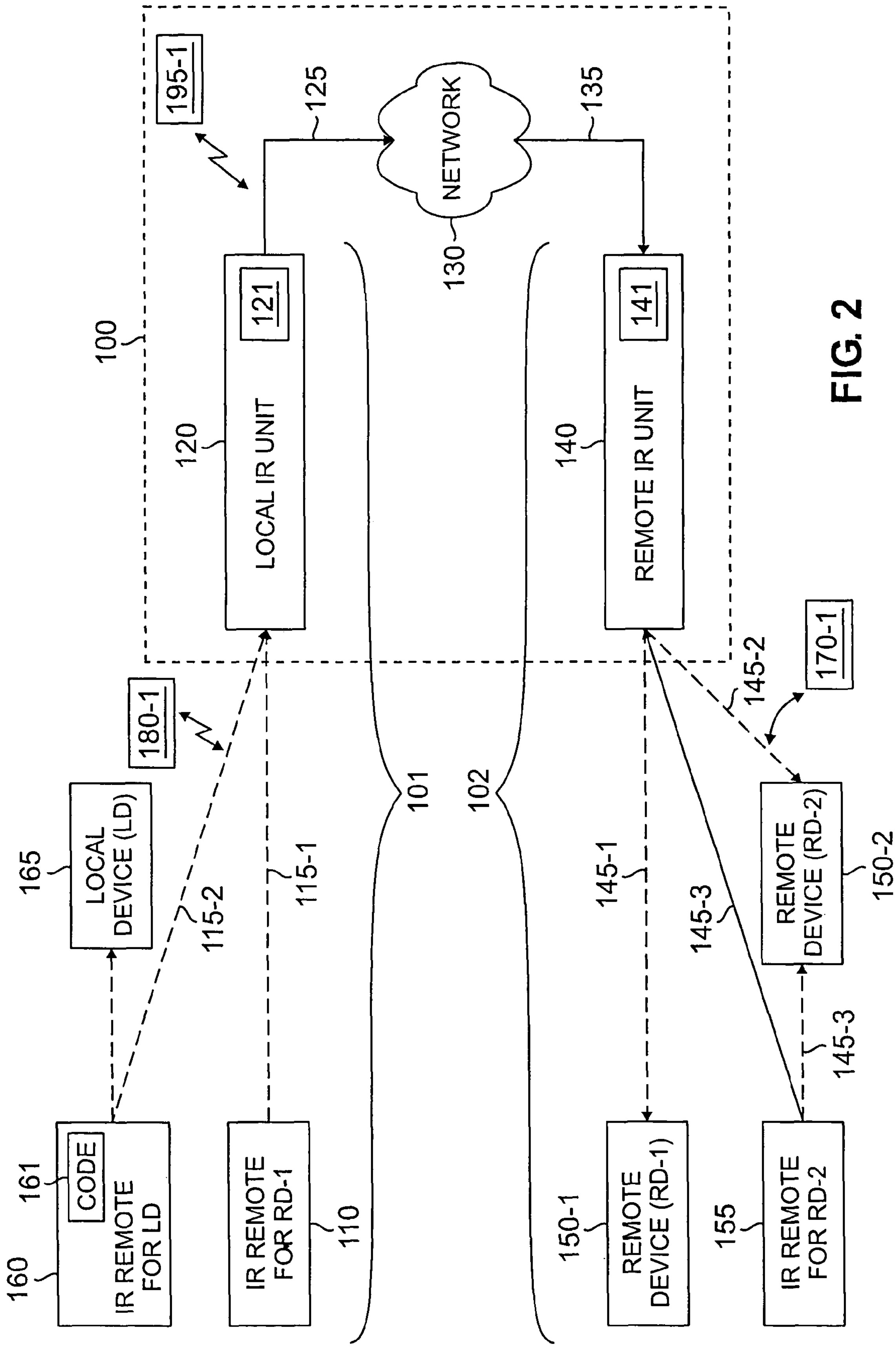

FIGS. 1 and 2 illustrate an exemplary remote control code relaying system 100, remote controls, devices, and their interface. FIG. 1 will be described first in order to describe typical relaying of remote control codes. FIG. 2 will be then be used to describe a problem with conventional relaying of remote control codes. The remote control relaying system 100 can, however, implement exemplary embodiments of the present invention and therefore solve the problems associated with the description below of FIG. 2.

Turning now to FIG. 1, the remote control relaying system 100 is shown accepting electromagnetic (EM) remote control signal 180 that has been transmitted by IR remote 110 through IR channel 115-1 to the remote control relaying system 100.

The remote control relaying system 100 is also shown transmitting an EM remote control signal 170 to the remote device 150-1 through IR channel 145-1. In the example of FIG. 1, both the EM remote control signal 180 and the EM remote control signal 170 are IR remote control signals, but this is for illustration only. For instance, one or both of the EM remote control signals could be RF remote control signals or any other type of suitable remote control signal. Remote control relaying system 100 comprises a local IR unit 120, a network 130, and a remote IR unit 140. The local IR unit 120 and the network 130 communicate through a network channel 125, while network 130 communicates to the remote IR unit 140 through a network channel 135. The IR remote 110 and the local IR unit 120 are located in local location 101, associated with a user, and the remote device 150-1 and the remote IR unit 140 are located in a remote location 102.

Sometimes, a user might have a device, such as remote device 150-1, located in a remote location 102. For instance, the user might be in a bedroom (e.g., as local location 101) and the remote device 150-1 might be a music player located in a central media location or in another room such as the family room. The music player provides music to the local location 101. The user can use the IR remote 110, in the local location 101, to control the remote device 150-1.

The user might hit a "pause" button (not shown), for instance. The IR remote 110 then determines an appropriate original remote control code 111 for the button and transmits a corresponding EM remote control signal 180 over the IR channel 115-1. The original remote control code 111 comprises a header 106, a device code 107, a function code 108, and a trailer 109.

As described above, the header 106 is used to alert a device that a remote control code (e.g., EM remote control signal 180) is being sent. The device code 107 is used to distinguish between devices using the same carrier frequency. The function code 108 determines what function will be performed by a device (in this example, remote device 150-1). The trailer is used to alert the device that the remote control signal is ending.

The original remote control code 111 is merely exemplary and other remote control codes may be used. For instance, some manufacturers add error correcting coding to a remote control code or will add or create repeat portions of the remote control code. Additionally, manufacturers of remote controls have released original remote control codes 111. Consequently, the original remote control codes 111 can be determined by contacting the manufacturer, and many conventional remote control systems use databases of original remote control codes 111 in order to transmit the appropriate EM remote control signals 180 or 170.

The original remote control code 111 is converted, as described below in an exemplary description, to the EM remote control signal 180. The original remote control code 111 can be binary data, hexadecimal data, register values, or any other data. Additionally, the IR remote 110 can correlate row and column data corresponding to a key press to a function code 108.

The IR remote 110 creates an EM remote control signal 180 from the original remote control code 111. The EM remote control signal 180 is an EM signal representation of the original remote control code 111. For instance, the IR remote 110 could create the EM remote control signal 180 by turning on an IR transmitter (not shown in FIG. 1) for a certain amount of time and turning the IR transmitter off for a certain amount of time for each binary digit of the original remote control code 111. An EM remote control signal 180 is created through this process, and the EM remote control signal 180 comprises a header 181, a device code 182, a function code 183, and a trailer 184. The header 181 is an EM signal representation of header 106. Similarly, the device code 182, function code 183, and trailer 184 are each EM signal representations of device code 107, function code 108, and trailer 109, respectively.

EM signal portion 195 illustrates how the first two binary digits of the device code 107 are represented in device code 182 and also illustrates a typical convention for IR remote control signals. A binary "1" 191 in the device code 107 is translated into a time period 186 of having the IR transmitter on and a time period 187 of having the IR transmitter off. A binary "0" 192 in the device code 107 is translated into a time period 188 of having the IR transmitter on and a time period 189 of having the IR transmitter off, where time period 186 is typically longer than time period 188.

The local IR unit 120 receives the EM remote control signal 180 and converts it to a remote control code 121. The remote control code 121 is typically binary data and is a representation of the EM remote control signal 180. It should be noted that storage format for the remote control code 121 and the storage format for the remote control code 111 in IR remote 110 might not be the same. The local IR unit 120 determines a carrier frequency at which the IR transmitter operates (e.g., in time periods 186 and 188). It should be noted that there could be multiple portions of the local IR unit 120, so that the local IR unit 120 could receive different carrier frequency ranges. The carrier frequency information is placed into a packet, a portion of which is shown as packet portion 195, which comprises frequency information 196, a device code 197, and a function code 198. The device code 197 and function code 198 are portions of the remote control code 121, although the portion can also be the entire remote control code 121 if desired.

In an exemplary embodiment, the frequency information 196 is a binary representation of the carrier frequency of the EM remote control signal 180 (e.g., in time periods 186 and 188), the device code 197 is a binary representation of the device code 182, and the function code 198 is a binary representation of the function code 183. In the example of FIG. 1, the device code 197 and the function code 198 can define a portion of remote control code 121, and the frequency information 196 can be used to distinguish between remote control codes 121. In another embodiment, the frequency information 196 is also used to define a remote control code 121. In the example of FIG. 1, information in remote control code 121 corresponding to header 181 and the trailer 184 is not used in the packet portion 195. However, information in remote control code 121 corresponding to header 181 and the trailer 184 can be used in the packet portion 195 if desired.

Because there is generally some amount of error in converting the EM remote control signal 180 to the remote control code 121, the device code 197 and function code 198 typically will not be an exact representation of the device code 107 and function code 108. However, some error is not a problem for most IR systems.

The packet portion 195 is transmitted via network 130 to the remote IR unit 140. The network 130 is typically a wireless network, but can be a wired network or a combination wired and wireless network. The remote IR unit 140 uses the packet portion 195 and creates a remote control code 141, and from the remote control code 141, an EM remote control signal 170 that comprises a header 171, a device code 172, a function code 173, and a trailer 174. The device code 172 is an EM signal representation of the device code 197, while the function code 173 is an EM signal representation of the function code 173. In this exemplary embodiment, the remote IR unit 140 uses the frequency information 196, the device code 197, and the function code 198 to determine appropriate header and trailer information (not shown) in remote control code 141, and the header and trailer information is converted to header 171 and trailer 174 portions of the EM remote control signal 170. Typically, one portion, such as an IR transmitter, of the remote IR unit 140 is used to generate all carrier frequencies. The remote device 150-1 receives the EM remote control signal 170 and performs a function corresponding to the function code 183.

Thus, a user in local location 101 can use IR remote 110 to control remote device 150-1 in remote location 102. This allows the user to start, pause, and stop music, for example, or to select a different song or title.

A problem arises, however, when a user uses another remote control 160 to control a local device 165, as shown in FIG. 2. The remote control code 161 is converted by the IR remote 160 to an EM remote control signal 180-1 and communicated over IR channel 115-2 to local IR unit 120. Local IR unit 120 creates a packet portion 195-1 corresponding to the remote control signal 180-1 and communicates the packet portion 195-1 through the network 130 to the remote IR unit 140. The remote IR unit 140 then creates an EM remote control signal 170-1, which is communicated over both the IR channels 145-1 and 145-2. One EM remote control signal 170-1 is received by both remote devices 150-1 and 150-2. The remote device 150-1 ignores the remote control signal 170-1, but the remote device 150-2, which is similar to or the same as local device 165, interprets the remote control signal 170-2 and performs a corresponding function that is unintended and unwanted.

Thus, the user in local location 101 has caused the unintended action of the remote device 150-2 performing a function. Similarly, when a user in remote location 102 uses the IR remote 155, an EM remote control signal (not shown) from the IR remote 155 can be transmitted (e.g., by being converted to a packet portion, sent through network 130, and by having the packet converted to another EM remote control signal) to the local device 165. Consequently, there is a need for filtering of remote control codes so that unintended functions caused by relaying of remote control codes are minimized or eliminated.

The present invention provides techniques for filtering remote control codes so that certain remote control codes do not reach the remote device 150-2 (or local device 165). In an exemplary embodiment, the local IR unit 120 could convert the EM remote control signal 180 to a received remote control code 121 and compare a portion or all of the remote control code 121 with stored remote control codes (not shown in FIG. 1, but shown in FIG. 4). The comparison of the received remote control code 121 with the stored remote control codes determines how the received remote control code 121 should be filtered.

In an exemplary embodiment, the filtering acts as "pass-through" filtering: if there is a match between portions of a received remote control code 121 and a stored remote control code, then the received remote control code 121 is filtered by outputting a packet portion 195, corresponding to the received remote control code 121, to the network channel 125 and to the network 130. Thus, stored remote control codes define what remote control codes are output to the network 130. If there is no match between portions of a received and a stored remote control code, then the received remote control code is filtered by discarding the received remote control code. The received remote control code is deleted or stored, for instance.

In another exemplary embodiment, the filtering acts as a "rejection" filtering: if there is a match between portions of a received remote control code 121 and a stored remote control code, then the received remote control code 121 is discarded. Thus, stored remote control codes define what is to be rejected and discarded. The received remote control code is deleted or stored, for instance. Conversely, if there is no match between portions of a received remote control code 121 and a stored remote control code, then the received remote control code 121 is filtered by outputting a packet portion 195, corresponding to the received remote control code, to the network channel 125 and to the network 130.

If desired, two sets of stored remote control codes may be used, where one set defines those remote control codes that should be output to the network 130, while another set defines those remote control codes that should be discarded. Remote control codes that are not in either set could be output to the network 130 or discarded. Additionally, the system 100 could enter a learning mode and have the user determine whether the remote control code not in either set should be output or discarded.

It should be noted that the remote IR unit 140 could receive the remote control code by use of the packet portion 195-1, and perform filtering of remote control codes. In this exemplary embodiment, the local IR unit 120 would pass all remote control codes to the network 130 and the remote IR unit 140 would perform filtering of the remote control codes. Additionally, filtering could include outputting a remote control code that does not perform a function on a device. For instance, there may be 64 available function codes 108, but only 48 function codes might be correlated with an actual function performed by a device. Thus, one of the 16 function "invalid" function codes could be used to replace a valid function code 108. However, sometimes these remote control codes, while not assigned to buttons on a remote control, will still perform a function.

Additionally, the entire remote control code 111 (e.g., or 121 or 141) may be used during filtering. Alternatively, a portion of the remote control code 111 may be used during filtering. In particular, the device code 107 can be used to filter all remote control codes corresponding to a device. In another exemplary embodiment, the device code 107 and the function code 108 can be used to filter only certain functions corresponding to certain remote control codes. Furthermore, the frequency information 196 can also be used during filtering (e.g., along with or as part of a remote control code). Moreover, one device code 107 might operate multiple versions of the same device, and a "device code" is any information that can distinguish remote control codes meant for one device from remote control codes meant for another device. It should be noted that some IR remote control codes have "address" codes that are used as device codes. Meanwhile, other IR remote control codes have both device codes and address codes. For example, satellite receivers typically use the same device codes but allow different address codes so that multiple satellite receivers can be used in the same room. In the example of both device and address codes, the address code could be another portion of a remote control code used for filtering remote control codes, or the address code and the device code could be combined as one large device code.

As used herein, a "remote control code" can be an entire remote control code 111 (or 121 or 141) or a portion of the remote control code 111. For instance, a "remote control code" comprises as much as the remote control code 111 as is used for filtering of remote control codes. Thus, as described above, a device code 107 can be a "remote control code" in an exemplary implementation.

Figure 3:
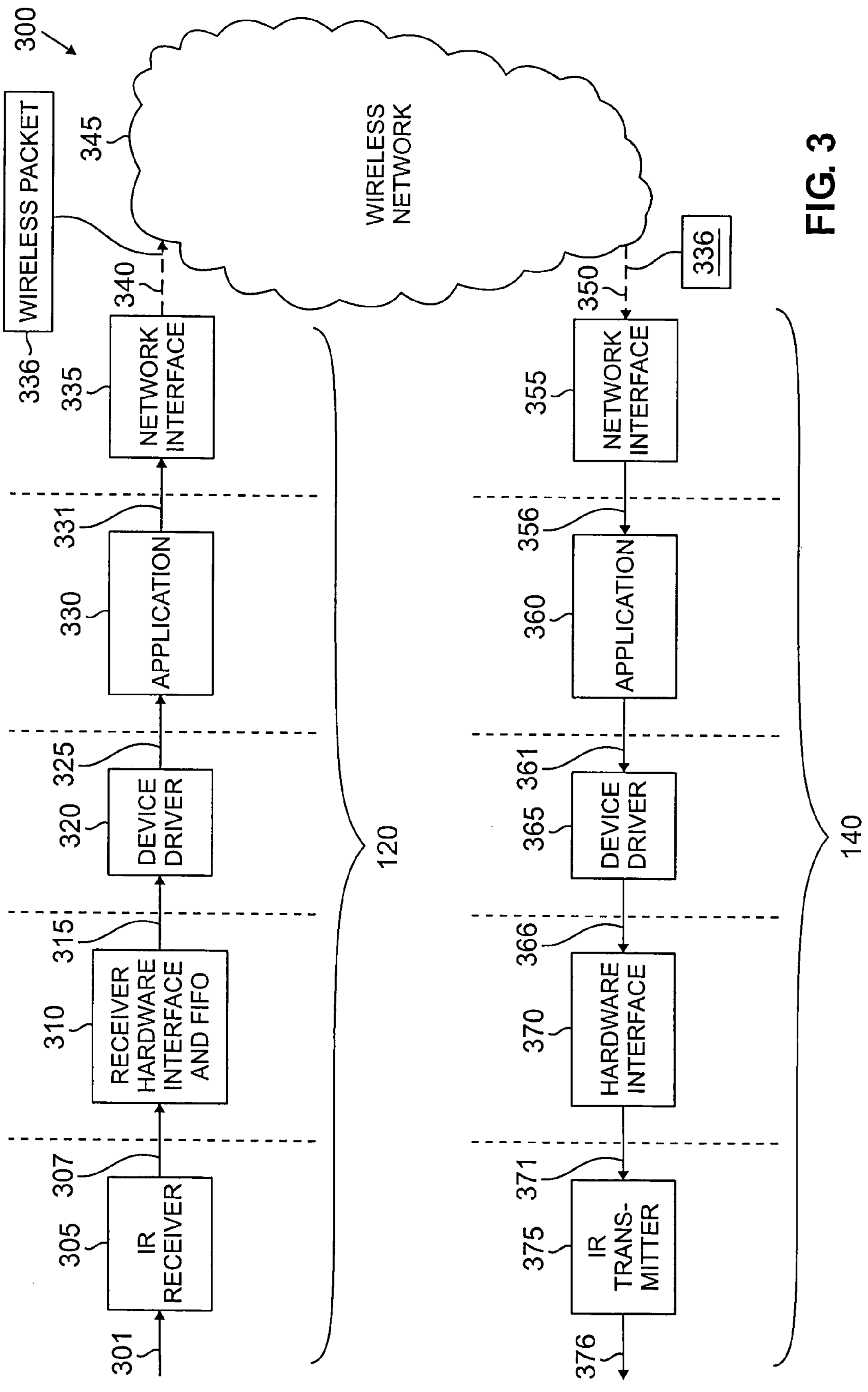
FIG. 3 is a block diagram of a second remote control code relaying system receiving and transmitting remote control signals.

Turning now to FIG. 3, a second remote control code relaying system 300 is shown receiving a remote control signal 301 and transmitting a remote control signal 376. Remote control signals 301 and 376 correspond to original remote control codes (e.g., such as original remote control code 111 of FIG. 1). The remote control signals 301 and 376 typically are IR remote control signals. However, any RF or other remote control signal using EM waves may be used. For the sake of exposition, IR remote control signals will be described herein.

The remote control relaying system 300 comprises local IR unit 120, wireless network 345, and remote IR unit 140. Although a wireless network 345 is shown, a wired or combination wired and wireless network may be used. Local IR unit 120 comprises an IR receiver 305, a hardware interface and First-In, First Out (FIFO) 310, a device driver 320, an application 330, and a network interface 335. The remote IR unit 140 comprises an IR transmitter 375, a hardware interface 370, a device driver 365, an application 360, and a network interface 355. The IR receiver 305 and IR transmitter 375 are typically external to circuit boards. However, they can be integrated onto a circuit board if desired.

The receiver hardware interface and FIFO 310 and the network interface 335 are typically components on a circuit board, while the device driver 320 and application 330 reside in memory (see FIG. 4) on the circuit board. Similarly, the hardware interface 370 and network interface 355 generally reside on a circuit board, while the device driver 365 and application 360 reside in memory (see FIG. 4) on the circuit board. The receiver hardware interface and FIFO 310 and the hardware interface 370 can be implemented by a Field-Programmable Gate Array (FPGA) bit file, for instance. Additionally, the hardware interface 370 can be implemented as part of an integrated circuit. The device drivers 320, 365 and network interfaces 335, 355 are typically low level system interfaces. It should be noted that network interfaces 335, 355 may have low level and system level components. The application 330, 360 are typically system level interfaces.

The remote control signal 301, which corresponds to an original remote control code (e.g., original remote control code 111 of FIG. 1) is converted by the IR receiver 305 as a number of intervals 307, which are then counted by the receiver hardware interface and FIFO 310, which produces binary digits 315. An exemplary IR receiver and receiver hardware interface and FIFO 310 is shown in more detail in reference to FIG. 7. Additionally, intervals 307 are shown in more detail in reference to FIG. 8. The device driver 320 is a software interface between the application 330 and the receiver hardware interface and FIFO 310. The device driver 320 packages binary digits 315 into received remote control code data 325.

Figure 4:
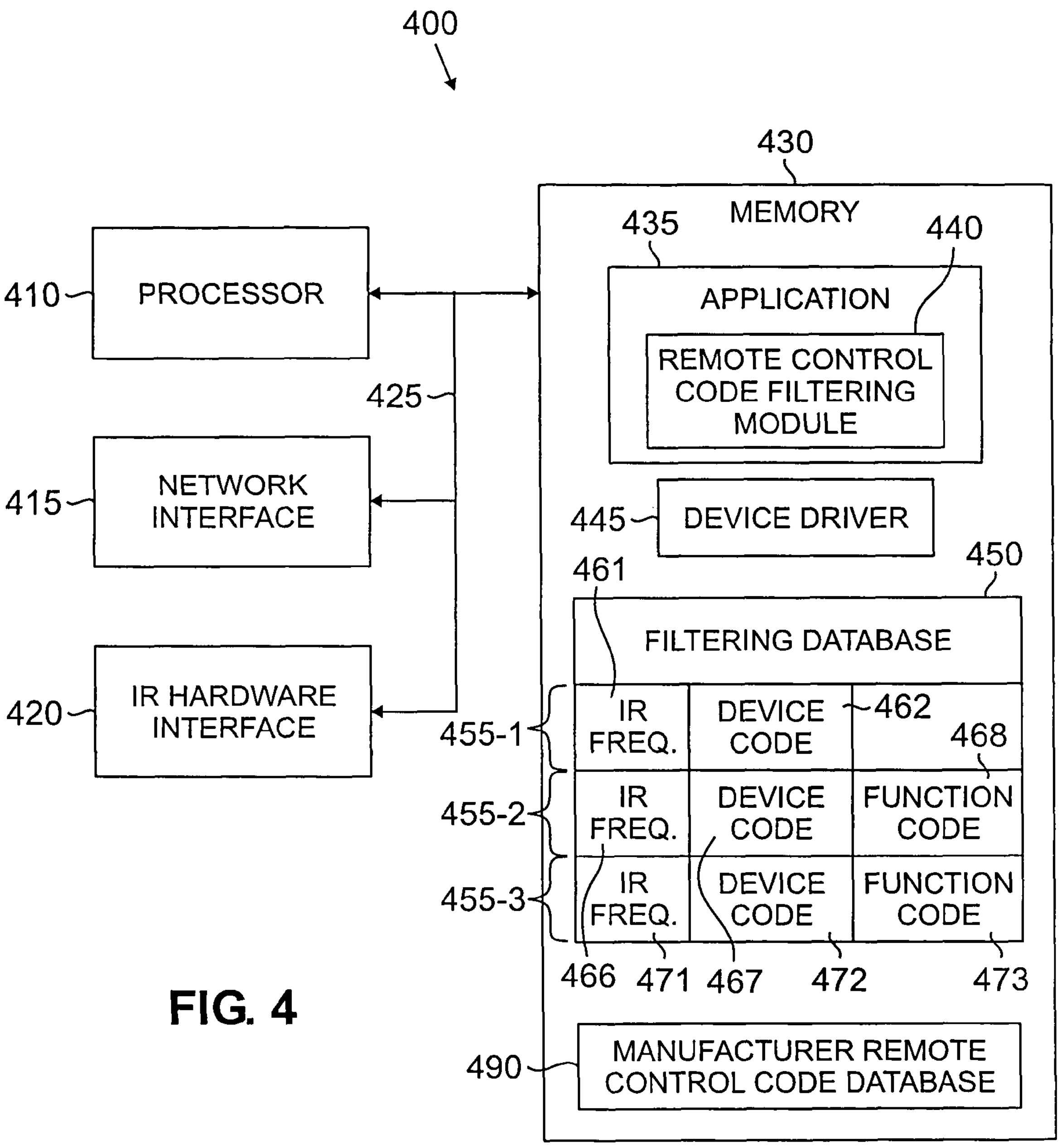
FIG. 4 shows an exemplary computer system suitable for use for implementing an illustrative embodiment of the present invention.

The application 330 has a portion, shown in FIG. 4, that filters remote control code data 325 by examining the received remote control code data 325 (e.g., or portions thereof) and comparing the received remote control codes 325 to stored remote control codes (see FIG. 4). If a received remote control code 325 is to be output as part of filtering, remote control codes 325 or portions thereof are output to the network interface 335 through connection 331, and the network interface 335 creates wireless packets 336 in this example. The wireless packets 336 are transmitted through wireless channel 340, the wireless network 345, and through wireless channel 350. If a received remote control code 325 is not to be output as part of filtering, then the received remote control code 325 can be deleted or stored, for instance.

Wireless packets 336 received at the remote IR unit 140 are received by the network interface 355, which creates a remote control code 356 (e.g., or a portion thereof). The application 360 typically will create remote control code data 361 from all or a portion of the remote control code 356. The remote control code data 361 could comprise a header, device code, function code, and trailer, as shown previously. The device driver 365 then outputs the remote control code data 361 as binary digits 366. Depending on implementation of the hardware interface 370, the device driver 365 might output the entire remote control code data 361 at one time or output portions of the remote control code data 361 over a number of cycles. The IR transmitter 375 then creates an EM remote control signal 376.

Application 360 may also perform filtering of remote control codes. In this exemplary embodiment, the application 330 would transmit all remote control codes 325 and the application 360 would receive the remote control codes 356 (e.g., or portions thereof) and filter the received remote control codes (e.g., or portions thereof).

Turning now to FIG. 4, an exemplary computer system 400 is shown that is suitable for use for implementing an illustrative embodiment of the present invention. Computer system 400 comprises a processor 410, a network interface 415, a hardware interface 420, and a memory 430. The processor 410, network interface 415 and memory 430 are coupled by a bus 425. Although only one of each of the processor 410, network interface 415, memory 430, and bus 425 is shown, there may be multiple processors 410, network interfaces 415, memories 430, or buses 425. The memory 430 comprises an application 435, a device driver 445, a filtering database 450, and a manufacturer remote control code database 490. The application 435 comprises a remote control code filtering module 440. The filtering database comprises three remote control code entries 455-1, 455-2, and 455-3. Remote control code entry 455-1 comprises IR frequency information 461 and a device code 462. The remote control code entry 455-2 comprises IR frequency information 466, a device code 467, and a function code 468. The remote control code entry 455-3 comprises IR frequency information 471, a device code 472, and a function code 473.

The application 435 can be application 330 or application 360 of FIG. 3. In the following example, the remote control code filtering module 440 operates in a "duplex" mode, where the remote control code filtering module 440 will filter remote control codes received from the network interface 415 or from the IR hardware interface 420. For instance, a remote control code could be received by remote control code filtering module 440 from the network interface 415. The remote control code filtering module 440 will filter the remote control codes and either discard the remote control codes or output the remote control codes to the IR hardware interface 420, coupled to an IR transmitter (not shown in FIG. 4). As another example, a remote control code could be received by the remote control code filtering module 440 from the IR hardware interface 420. In this example, the remote control code filtering module 440 will filter the remote control codes and either discard the remote control codes or output the remote control codes to the network interface 415.

The filtering database 450 comprises the remote control code entries 455, which comprise stored remote control codes. In the example of FIG. 4, the stored remote control codes are portions of remote control codes, where each portion comprises a device code or a device code and a function code. Additionally, the IR frequency information may be used to define a remote control code and used to filter a remote control code, if desired. In the following description, the IR frequency information is used to filter remote control codes. The remote control code filtering module 440 will filter remote control codes corresponding to the IR frequency information 461 and matching the device code 462. Thus, all remote control codes from a particular device will be subject to filtering. The remote control code filtering module 440 will filter remote control codes corresponding to the IR frequency information 466 and matching the device code 467 and the function code 468. Similarly, the remote control code filtering module 440 will filter remote control codes corresponding to the IR frequency information 471 and matching the device code 472 and the function code 473.

Although not shown in FIG. 4, the filtering database 450 can comprise additional information. For instance, the header and trailer information previously described in reference to FIGS. 1 and 2 may be stored in the filtering database 450. Additionally, some devices use address codes in addition to device and function codes, so the address codes can be stored in the filtering database 450. Alternatively, the address codes could be integrated with a device code. Some remote controls also send error correcting codes, so the error correcting codes can be stored in the filtering database 450 or be determined by the remote control code filter module 440. If a repeat sequence is used, the fact that a repeat sequence is used can be stored in the filtering database 450.

Figure 5:
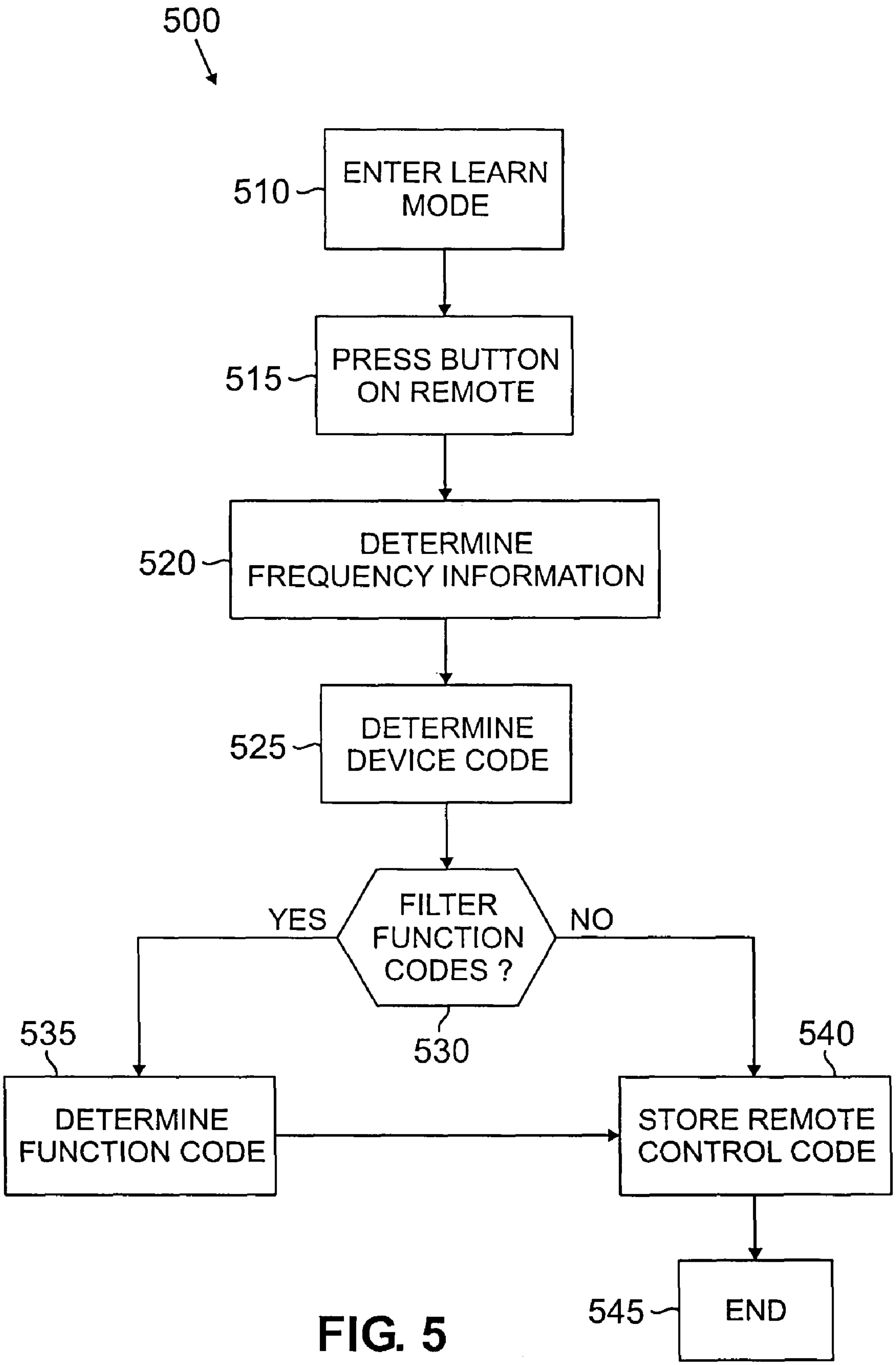
FIG. 5 is a flowchart of an exemplary method for learning and storing remote control codes to be filtered.

The remote control code entries 455 can be learned, as described in reference to FIG. 5, or can be selected from the manufacturer remote control code database 490. A user can select, for filtering, specific remote control codes corresponding to certain functions (e.g., such as those functions corresponding to remote control code entries 455-2 and 455-3) or remote control codes corresponding to an entire device (such as that shown in reference to remote control code entry 455-1). Typically, a user would select particular buttons for a device or particular devices from the manufacturer remote control code database 490 in order to filter remote control codes corresponding to the button or remote control codes corresponding to the particular device.

It should be noted that the filtering database 450 could be split into multiple sections. For instance, one section could house remote control codes for "pass-through" filtering, while another filtering database could house remote control codes for "rejection" filtering.

As is known in the art, portions of the remote control code filtering module 440 will be transferred to the processor 410 and executed in order to perform portions of one or more of the embodiments described herein. Additionally, part or all of the remote control code filtering module 440 may be implemented as a program product, comprising one or more programs suitable for use in memory 430 that, when executed, will perform one or more of the embodiments described herein. Furthermore, portions or all of the computer system 400 can be implemented as an integrated circuit. In particular, the remote control code filtering module 440 and filtering database 450 can be implemented as an integrated circuit.

Referring now to FIG. 5, an exemplary method 500 is shown for learning and storing remote control codes to be filtered. Method 500 would typically be performed by a remote control code filtering module 440 (see FIG. 4). Method 500 is used to learn remote control codes to be filtered by having a user press buttons on a remote control and by determining and storing portions or all of learned remote control codes.

Method 500 begins when a learn mode is entered. The learn mode indicates that the remote control codes received are to be learned and not filtered during the learning process. In step 515, the user presses a button on the remote control. In step 520, frequency information corresponding to the IR carrier frequency the remote control uses is determined. For instance, the IR carrier frequency might be 78 kilohertz (KHz), and the frequency information could be binary digits that represent the frequency of 78 kHz. RF frequency information can be similarly determined.

In step 525, the device code is determined. If all remote control codes corresponding to the device are to be filtered (step 530=NO), then the device code is stored as a portion of a remote control code in step 540. If a function code is to be used for filtering (step 530=YES), then the function code is determined in step 535 and the function code is stored along with the device code as a portion of remote control code. This occurs in step 540. The method 500 ends in step 545.

It should be noted that steps 515 through 540 may be performed to learn new remote control codes corresponding to different functions for a remote control. Additionally, the steps 515 through 525 may be performed multiple times (with the same or different buttons on the remote control being pressed by the user) to ensure that the device code is determined correctly. Thus, subsequent buttons may be pressed to determine the device (or address code) by identifying the identical part or parts of the subsequent data streams caused by the buttons.

Additionally, FIG. 5 can be modified for use with a manufacturer remote control code database. In step 515, the user can select a device and optionally a remote control button (e.g., corresponding to a function code) instead of pressing a button on the remote control. Steps 520, 525 and 535 would determine information from the manufacturer remote control code database.

Figure 6:
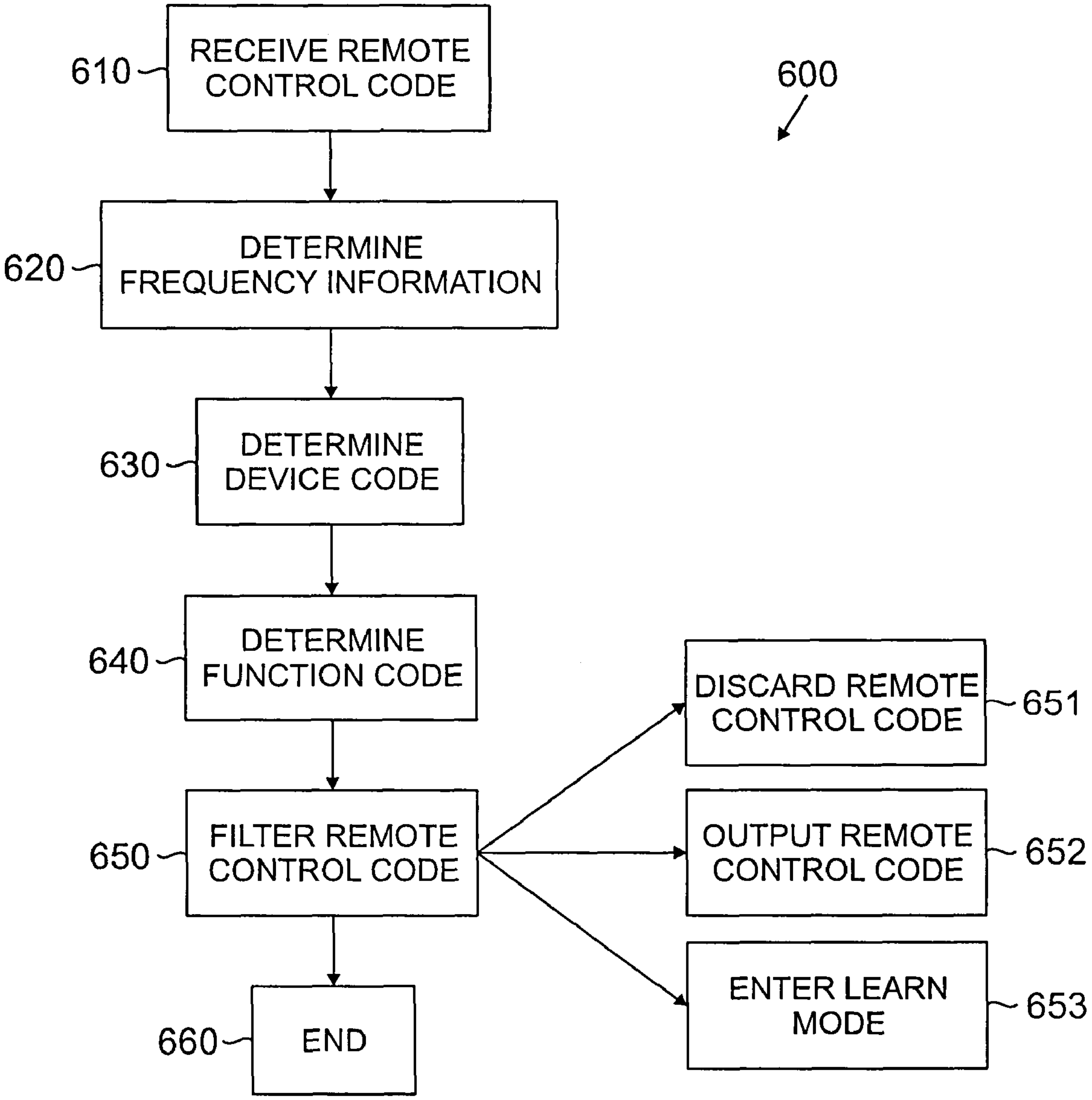
FIG. 6 is a flowchart of an exemplary method for filtering remote control codes.

Referring now to FIG. 6, an exemplary method 600 is shown for filtering remote control codes. Method 600 is generally performed by a remote control code filtering module 440 (see FIG. 4) and is used to filter unwanted remote control codes from being received by remote devices.

Method 600 begins in step 610, when a remote control code, or a portion thereof, is received, such as through a network interface or an IR interface. In step 620, frequency information corresponding to the carrier frequency of the EM remote control signal used to transport the remote control code is determined. In terms of an IR interface, the carrier frequency can be determined and communicated to the remote control code filtering module 440 (see FIG. 4). In terms of receiving the remote control code from a network interface, frequency information is typically received in addition to or as part of the received remote control code. In step 630, the device code of the received remote control code is determined. In step 640, the function code of the received remote control code is determined.

In step 650, the remote control code is filtered. There are a variety of techniques suitable for filtering. As described above, filtering could act as pass-through filtering: if there is a match between portions of a received and a stored remote control code, then the received remote control code is filtered by outputting (step 651) a packet portion, corresponding to the received remote control code, e.g., to a network interface or a hardware interface. Thus, stored remote control codes define what remote control codes are output. If there is no match between portions of a received and a stored remote control code, then the received remote control code is filtered by discarding (step 652) the received remote control code. The received remote control code is deleted or stored, for instance.

In another exemplary embodiment, the filtering can act as rejection filtering: if there is a match between portions of a received and a stored remote control code, then the received remote control code is filtered by discarding (step 651) the remote control code. Thus, stored remote control codes define what is to be rejected and discarded. The received remote control code is deleted or stored, for instance. Conversely, if there is no match between portions of a received and a stored remote control code, then the received remote control code is filtered by outputting (step 652) the received remote control code.

These techniques can be combined. For instance, two sets of stored remote control codes may be used, where one set defines those remote control codes that should be output, while another set defines those remote control codes that should not be output. Remote control codes that are not in either set could be output or discarded, depending on how a system is implemented. Alternatively, remote control codes that are not in either set can cause a system to enter (step 653) the learn method 500 of FIG. 5 so that a new remote control code can be learned and the filtering options (e.g., output or discard) can be entered for the new remote control code.

Note that step 650 can also use the frequency information, for those instances where the remote control codes are the same for two different frequencies. Furthermore, additional remote control code information, such as headers, trailers, or addresses may be used. In step 660, method 600 ends. Additionally, if only device codes (for instance) are being used to filter remote control codes, then steps 620 and 650 might not be performed.

Figure 7:
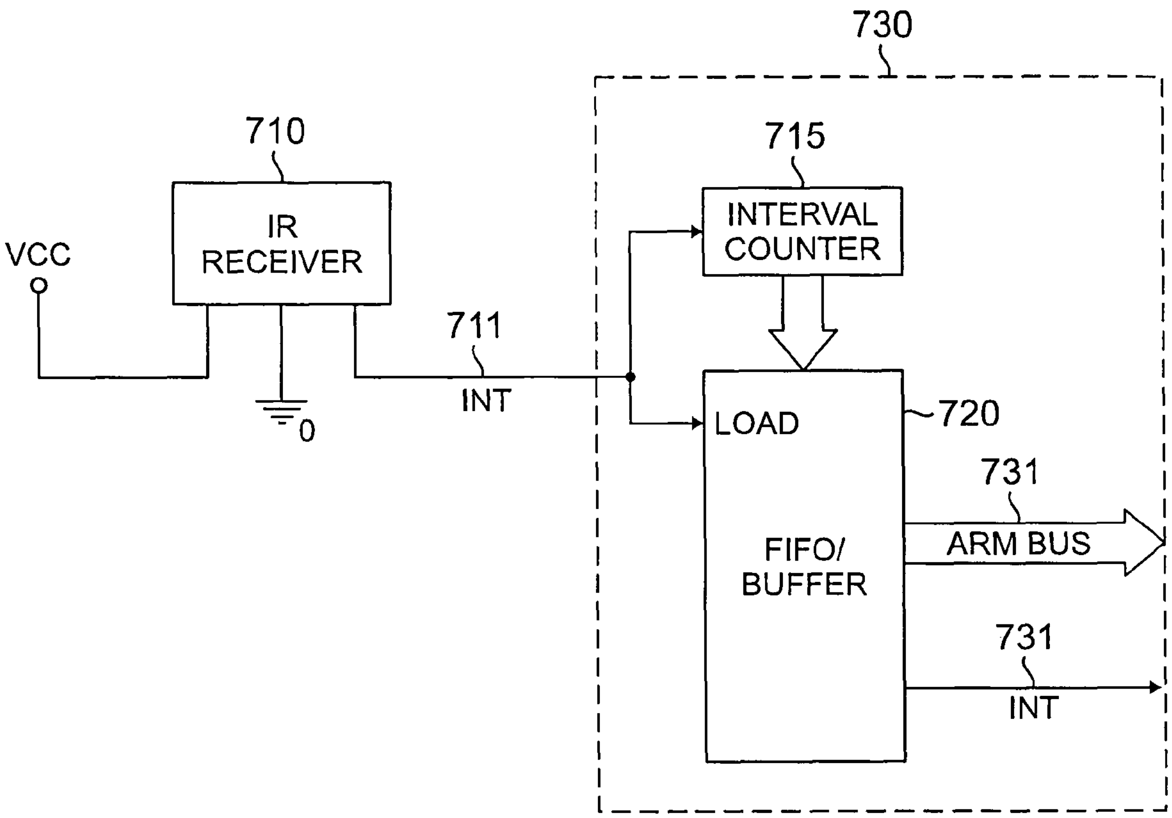
FIG. 7 is a block diagram of an IR receiver and hardware interface, in accordance with an exemplary embodiment of the present invention.

Referring now to FIG. 7, an IR receiver 710 and a hardware interface 730 are shown, in accordance with an exemplary embodiment of the present invention. Hardware interface 730 comprises an interval counter 715 coupled to a FIFO 720. A FIFO is a type of buffer, and other buffers may be used. The circuit of FIG. 7 may be used with an Advance Reduced Instruction Set (RISC) Microprocessor, commonly referred to as an ARM. The hardware interface 730 is coupled to an ARM bus 731 and an interrupt line 732, each of which would be coupled to an ARM (not shown in FIG. 7). Other types of processors may be used.

In an exemplary embodiment of the present invention, it is possible to use standard IR detecting devices for an IR receiver 710. Such standard IR detecting devices include IR detection diode amplifiers, Automatic Gain Control (AGC) and control pulse filtering. Standard IR detecting devices have a central frequency depending on the modulating IR carrier frequency, so that certain bandwidth IR remote control signals can be received. To be able to receive a larger range of IR control devices, several IR detectors can be placed in parallel connected to different input pins of a controlling processor (e.g., such as an ARM).

The IR detection receiver 710 will detect an IR pulse sequence (not shown in FIG. 7). If several IR receivers 710 are used in parallel, then the ARM recognizes at which pin the IR signal arrives and determines in this way what the re-modulating carrier frequency will have to be. The carrier frequency can then be determined and stored as frequency information.

As a more specific example, TSOP1238 from Vishay Intertechnology, Inc. of Malvern, Pa. 19355-2120, may be used as an IR receiver 710. The IR receiver 710 is tuned to 38 KHz and can decode the following codes (within its frequency limits): Sony SIRC, Sharp and NEC code, Toshiba Micom Format, RC5 and RC6 Code, RCMM Code, R-2000 Code, RECS-80 Code, and others. The IR receiver 710 typically generates an interrupt 711 for each detected IR event. In order not to disturb the ARM processor for each IR event, appropriate buffering may be used, as provided by the hardware interface 730. In an exemplary embodiment, each interrupt one interrupt line 711 causes two things to happen:

(1) The current count value is loaded into the FIFO 720; and (2) The interval counter 715 is cleared and a new count is started.

Figure 8:
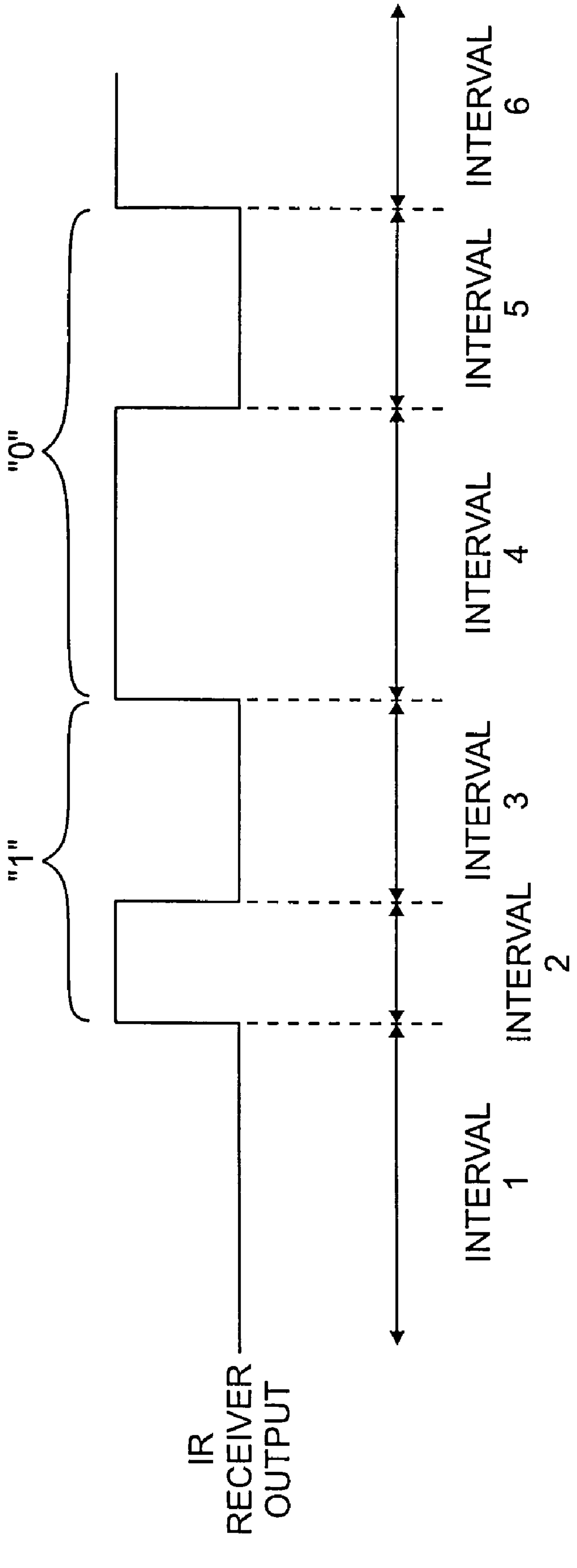
FIG. 8 is a graph of an exemplary output of the IR receiver of FIG. 7.

In order to fully recreate the waveform, all intervals associated with the IR transmission are accumulated, as shown in FIG. 8, which is a graph of an exemplary output of the IR receiver 710 of FIG. 7. In this example, interval 2 and interval 2 indicate that a "1" was sent, while intervals 4 and 5 indicate that a "0" was sent.

Once a complete IR transmission (called a "packet") has been received, the ARM can be interrupted. It can be assumed that a complete packet has been received when there is:

(1) An overflow count value prior to packet start;

(2) At least N numbers of characters (e.g., count values) have been received in the FIFO; or (3) A counter overflow value occurs after the last character.

Once the ARM has been interrupted, a dedicated device driver (see FIG. 3) would get the IR packet from the FIFO, process it, remove unnecessary parts such as noise related intervals, and signal an application that a valid IR packet is ready to be filtered.

Figure 9:
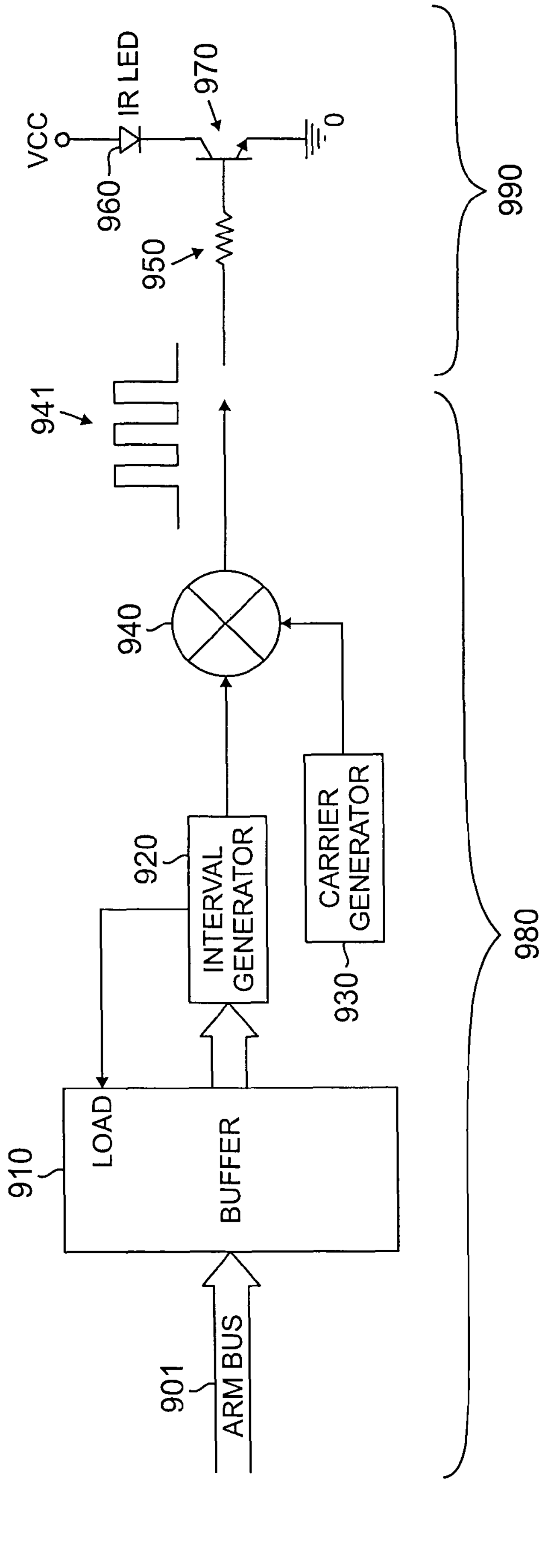
FIG. 9 is a block diagram of an exemplary hardware interface and IR transmitter, in accordance with an exemplary embodiment of the present invention.

Turning now to FIG. 9, a hardware interface 980 and IR transmitter 990 are shown coupled together, in accordance with an exemplary embodiment of the present invention. The hardware interface 980 comprises a transmit buffer 910, an interval generator 920, a carrier generator 930, and a multiplier 940. The transmit buffer 910 comprises an ARM bus 901. The IR transmitter 990 comprises a resistor 950, a transistor 970, and an IR Light Emitting Diode (LED) 960.

When a packet having remote control code data is ready to transmit, the Application should call the IR device driver (e.g., device driver 365 of FIG. 3) instructing the IR device driver to transmit the remote control code data. The IR device driver would than load the remote control code data onto a transmit buffer 910 and trigger an exemplary automatic IR transmission process, as described in the following section.

Once the transmit buffer 910 has been loaded and set, the transmit buffer 910 starts loading the intervals onto the interval generator 920. The output of the interval generator 920 is a rectangular waveform that matches the envelop of an IR remote control signal corresponding to the remote control code. The envelope is then multiplied by the multiplier 940 with the carrier (from the carrier generator 930). This results in a rectangular waveform 941, which is transmitted using the bipolar junction transistor 970 and the IR LED 960.

The previously described embodiments are merely exemplary, and other embodiments are possible. For instance, the remote control code filtering could be extended to include multiple remote locations. Some remote control codes could be transmitted to only to particular remote locations. Thus, there could be two remote locations and certain remote control codes could be transmitted to one of the two remote locations but not to the other of the two remote locations. Internet Protocol (IP) addresses could be used, for example, to define the remote locations.

It is to be understood that the embodiments and variations shown and described herein are merely illustrative of the principles of this invention and that various modifications may be implemented by those skilled in the art without departing from the scope and spirit of the invention.

We claim:

1. A method for filtering remote control codes in a remote control code relaying system, the method comprising the steps of:

receiving a remote control code;

comparing a portion of the received remote control code with a corresponding portion of a given one of one or more stored remote control codes; and filtering the received remote control code based on the comparison and 10 frequency information;

the step of comparing further comprises the step of comparing the portion of the received remote control code with a corresponding portion of each of the one or more stored remote control codes and determining there is no match between the portion of the received remote control code and a corresponding portion of each of the one or more stored remote control codes; and the step of filtering the received remote control code based on the comparison further comprises the steps of:

determining whether the remote control code should be output or discarded; and adding the new remote control code to the one or more stored remote control codes based on the determination of whether the remote control code should be output or discarded.

* * * * *

UNITED STATES PATENT AND TRADEMARK OFFICE

CERTIFICATE OF CORRECTION

PATENT NO. : 7,924,167 B2
APPLICATION NO. : 10/874149
DATED : April 12, 2011
INVENTOR(S) : Piet Bernard Hesdahl and Amiram Levi It is certified that error appears in the above-identified patent and that said Letters Patent is hereby corrected as shown below:

In the Claims:

Column 13, claim 1, line 2, which reads: “comparison and 10 frequency information;” should read --comparison and frequency information;--.

Signed and Sealed this
Twenty-first Day of January, 2014

Michelle K. Lee
*Deputy Director of the United States Patent and Trademark Office*